H. B. WHITNEY.
DEVICE FOR ASSEMBLING BALL BEARINGS.
APPLICATION FILED MAY 21, 1913.
1,074,228.
Patented Sept. 30, 1913.
2 SHEETS—SHEET 1.
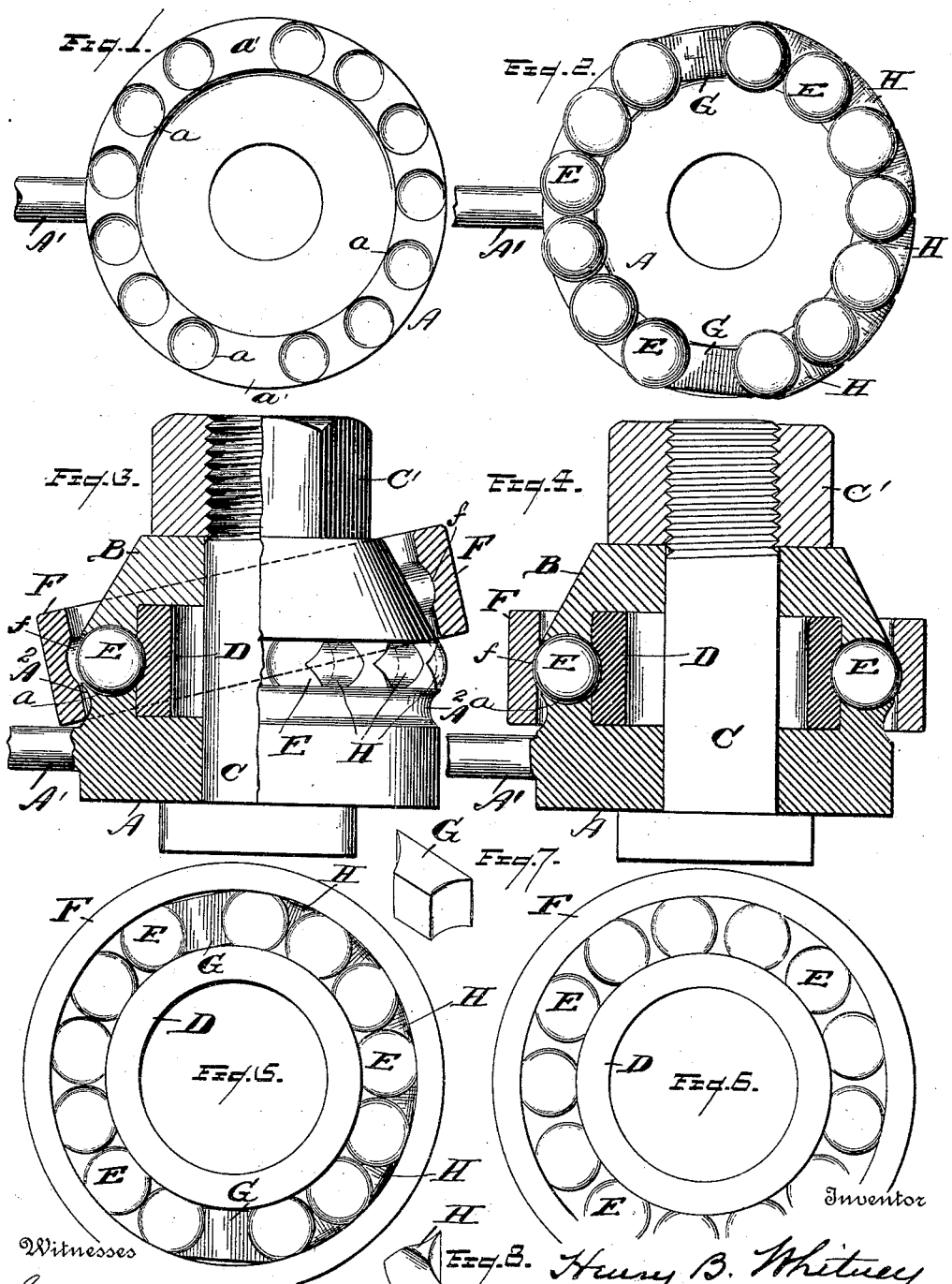

H. B. WHITNEY.
DEVICE FOR ASSEMBLING BALL BEARINGS.
APPLICATION FILED MAY 21, 1913.
1,074,228.
Patented Sept. 30, 1913.
2 SHEETS—SHEET 2.
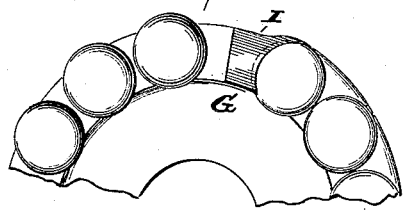
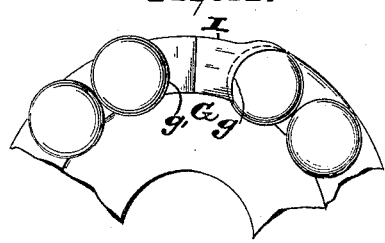
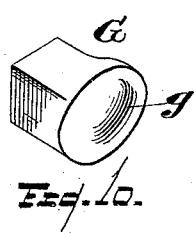
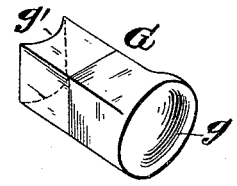
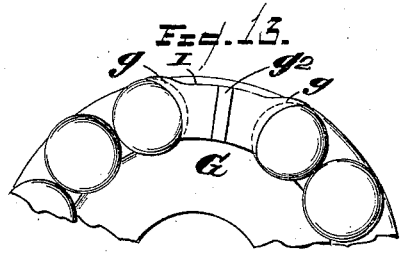
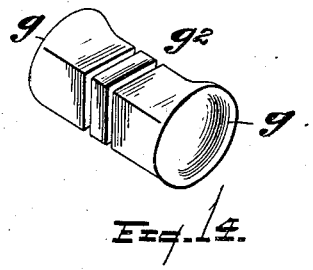
Witnesses
Grace E. Uynkoop.
Olive O'Mulvenny
Inventor
Henry B. Whitney
By J. E. Thomas
Attorney
COLUMBIA PLANOGRAPH CO., WASHINGTON, D. C.

UNITED STATES PATENT OFFICE.

HENRY B. WHITNEY, OF DETROIT, MICHIGAN, ASSIGNOR TO F. EARL LONG, OF DETROIT, MICHIGAN.

DEVICE FOR ASSEMBLING BALL-BEARINGS.

1,074,228.  Specification of Letters Patent.  Patented Sept. 30, 1913.

Application filed May 21, 1913. Serial No. 768,903.

*To all whom it may concern:*

Be it known that I, HENRY B. WHITNEY, citizen of the United States, residing at Detroit, county of Wayne, State of Michigan, have invented a certain new and useful Improvement in Devices for Assembling Ball-Bearings, and declare the following to be a full, clear, and exact description of the same, such as will enable others skilled in the art to which it pertains to make and use the same, reference being had to the accompanying drawings, which form a part of this specification.

My invention relates to a device for assembling ball bearings, shown in the accompanying drawings and more particularly set forth in the following specification and claims.

The object of the present invention is to provide means whereby a ball bearing consisting of a plurality of balls may be assembled between two annular rings respectively grooved on their inner and outer faces, without the necessity of notching or otherwise mutilating the rings in order to introduce the balls into the grooves forming the ball race.

Another object is to provide means whereby the balls may be readily introduced between the rings without injury to either the rings or balls due to forcing the balls into the race.

Other advantages and improvements will hereafter appear.

In the drawings accompanying this specification: Figure 1 is a plan view of an annular supporting plate having a plurality of cup-shaped depressions to receive the balls prior to their introduction between the rings forming the race, the depressions being separated into two groups. Fig. 2 is a plan view of the same with the balls in position. Fig. 3 is an elevation of the device with one-half in section, showing the inner ring of the race and balls clamped in position, the outer ring being shown as it is about to be forced over the key blocks protecting the ring and balls from injury. Fig. 4 is a cross-sectional view through the device and the assembled ball bearing clamped therein. Fig. 5 is an elevation of the ball bearing removed from the assembling device with the key blocks still in position. Fig. 6 is a view of the bearing with the key blocks removed and the balls spaced apart at regular intervals as they appear when in use. Fig. 7 is a perspective view of one of the large key blocks, indicating more clearly its flat outer face. Fig. 8 is a perspective view of one of the smaller key blocks for protecting the balls, with its curved outer face. Fig. 9 is a fragmentary view of the supporting base plate with the balls in position, showing a modification of the large key block lodged between the respective groups of the balls. Fig. 10 is a perspective view of the block shown in Fig. 9. Fig. 11 is another fragmentary view of the supporting plate with a modified form of the spacing block constructed in two parts, one portion of which has a cup-shaped end to receive the ball and the other provided with a straight channel. Fig. 12 is a perspective view of the key block shown in Fig. 11. Fig. 13 is a fragmentary view of the supporting plate showing another modification of the key block constructed in three parts—the ends, being cup-shaped to receive the balls, spaced apart by a flat block portion. Fig. 14 is a perspective view of the three part key block shown in Fig. 13.

Referring now to the letters of reference placed upon the drawings: A indicates a supporting base plate provided with a plurality of circularly arranged cup-shaped depressions $a$ adjacent to its periphery. These depressions are preferably arranged in two groups, the depressions being spaced a relatively greater distance apart at $a'$, $a'$.

B is a cone-shaped annular plate provided on its underface with a plurality of cup-shaped depressions corresponding in spacing and arrangement to those in the base plate A.

C is a bolt joining the plates A and B together, engaged by a nut $C'$.

D indicates the inner annular ring of the ball race having a groove on its outer face to receive the balls E.

F is the outer ring of the race having a groove $f$ on its inner face to receive the balls. The wall of the ring F in cross-section is somewhat thicker on one side of the groove than on the other,—the object of so constructing it will be hereafter explained.

G, G, indicate a pair of relatively wide key blocks introduced in the space between the groups of balls as indicated in Fig. 2.

H, H, are a plurality of small V-shaped key blocks, having a rounded outer face, lodged between the balls of one group, as shown in Figs. 2 and 5.

A′ is a pin projecting from the base plate which serves as a rest or guide for the outer ring when assembling the parts.

$A^2$ is a circumferential groove or cut away portion formed in the face of the base plate to accommodate the inner edge of the outer ring when the parts are being assembled.

Having indicated the several parts by reference letters, the construction and operation of the device will be readily understood. To assemble the bearing the central bolt C and the inner ring D of the race are first placed in position, the balls are then lodged in the several cup-shaped depressions of the base plate, the blocks G inserted between the two groups and the blocks H between the balls of the group directly opposite the pin A′, as indicated in Fig. 2. The top plate B is then placed over the balls and the nut C′ adjusted so as to clamp the balls, blocks and inner ring, firmly between the plates A and B. The outer ring of the race, which has been previously heated to provide for a slight expansion of the metal, is now sleeved over the assembling device as indicated in Fig. 3, the thinner side of the ring down, with the lower outer edge of the ring resting on the pin A′ which serves as a support and guide for the ring that the balls may readily enter the groove. The device is then reversed from the position shown in Fig. 3 and put in a suitable press, the tilted outer ring is now forced into concentric relation with the inner ring riding over the several key blocks H and in so doing the outer ring is elongated or given a slight elliptical form, to the extent of a small fraction of an inch. The key blocks G flattened on their outer face permitting a reduction in the diameter of the ring at this point. As indicated in Fig. 3, the grooved or cut-away portion $A^2$ of the base plate allows clearance for the inner edge of the ring F in assembling the parts and upon the ring being forced over the balls and key blocks (as indicated in Fig. 4) it springs back to its original form confining the balls in the raceway formed by the opposing grooves of the concentrically arranged rings. The bearing is now removed from between the clamping plates, the key blocks being still in position as indicated in Fig. 5. The large key blocks G are then punched out and the balls spread apart whereupon the smaller key blocks H are released.

In the modification shown in Figs. 9 and 10, the large key block G is made with a cup-shaped depression to receive and shield the ball. In Figs. 11 and 12 the key block is made in two parts; one part having a cup-shaped depression $g$ similar to that indicated in Fig. 10, the other having a straight channel $g'$,—the object being to provide means whereby this portion of the block may be readily knocked out in order to release the cup-shaped portion.

In the modification shown in Figs. 13 and 14, the key block G is made in three parts, the ends being cup-shaped as in Fig. 10, a central flat rectangular block $g^2$ being inserted between the end members which may be readily driven out thereby releasing the end blocks. Each of the modified forms of the blocks has a cut-away portion as indicated at I, to permit a slight flattening of the outer ring of the ball-bearing as it is forced over the balls in assembling the parts, as provided for in the flattened outer surface of the block G shown in Fig. 7.

Having thus described my invention, what I claim is:—

1. In a device for assembling ball-bearings comprising a plurality of balls retained between a pair of concentrically arranged rings having a grooved unbroken ball-race on the opposing faces of the rings, a pair of clamping members adapted to receive and hold the inner ring and a plurality of balls, and a plurality of removable elements to be lodged between the balls to protect both the balls and the inner face of the outer ring from injury when the latter is forced over the balls in assembling the parts, substantially as described.

2. In a device of the character described, a pair of clamping plates adapted to receive between them the grooved inner ring of a ball-bearing, an adjustable bolt connecting the plates together, said plates provided with cup-shaped depressions in their opposing faces to receive the balls of the bearing, and a plurality of elements adapted to extend partially around the balls to protect them and the grooved outer ring from injury when forcing the ring over the balls in assembling the several parts, substantially as described.

3. In a device of the character described, a pair of clamping plates adapted to receive the grooved inner ring of a ball-bearing having cup-shaped depressions in their opposing faces to receive the balls of the bearing, said depressions being arranged in two spaced groups, removable filler blocks in the space between the groups of balls, other removable elements lodged between the balls adapted to protect the outer face of the balls and the inner face of the outer ring from injury when the latter is forced over the balls in assembling the parts, and an adjustable bolt engaging the clamping plates.

4. In a device of the character described, a pair of clamping plates adapted to receive the grooved inner ring of a ball-bearing having cup-shaped depressions in their opposing faces to receive the balls of the bearing, said depressions being arranged in two spaced groups, an adjustable bolt engaging the clamping plates, removable filler blocks lodged in the spaces between the groups of balls and having flat outer faces, other removable elements adapted to be lodged between the balls and extend partially around the latter, whereby in forcing the outer ring over the balls in assembling the parts the ring and balls are protected from injury by the removable elements, the flattened filler blocks permitting a slight elongation of the outer ring that it may be more readily forced over the balls.

5. In a device of the character described, a pair of clamping plates adapted to receive between them a plurality of balls and the inner grooved ring of a ball bearing, an adjustable bolt connecting the plates together, a plurality of removable elements adapted to be temporarily lodged between the balls of the bearing to protect them and the outer ring from injury when forcing the latter over the balls in assembling the parts, and a pin projecting from the lower plate to support and guide the outer grooved ring when the latter ring is forced over the balls in assembling the parts.

6. In a device of the class described, a pair of clamping plates adapted to receive between them the inner ring of a ball-bearing and over which the outer ring of the bearing may be sleeved, means carried by one of said plates against which one edge of the outer ring is adapted to rest, said last named clamping plate being recessed to provide clearance for the outer ring in assembling the parts, and an adjustable bolt connecting the clamping plates together.

In testimony whereof, I sign this specification in the presence of two witnesses.

HENRY B. WHITNEY.

Witnesses:
 GRACE E. WYNKOOP,
 SAMUEL E. THOMAS.

---

Copies of this patent may be obtained for five cents each, by addressing the "Commissioner of Patents, Washington, D. C."